Dec. 15, 1964
J. H. BENT
3,161,323
REPEATING DISPENSER
Filed May 20, 1963
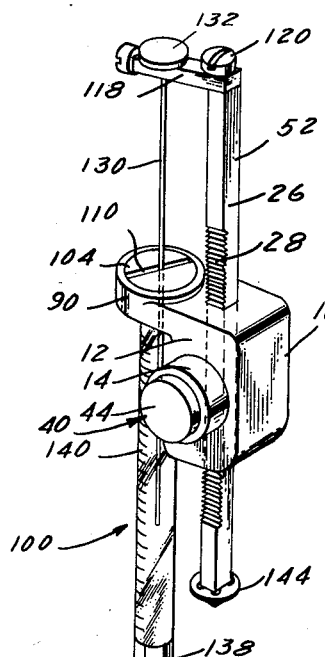
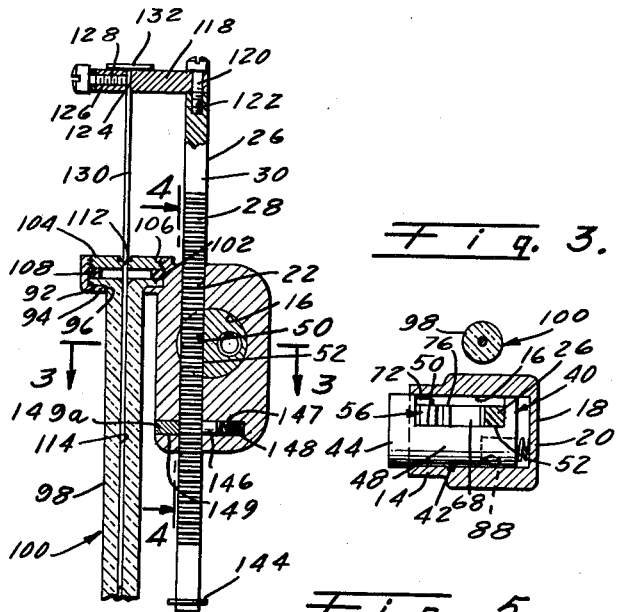
John H. Bent
INVENTOR.
BY
Attorney

3,161,323
REPEATING DISPENSER
John H. Bent, Fullerton, Calif., assignor to Hamilton Company, Inc., Whittier, Calif., a corporation of California
Filed May 29, 1963, Ser. No. 281,464
17 Claims. (Cl. 222—41)

This invention relates generally to dispensing devices and relates more particularly to repeating dispensers or indexing syringes.

While the invention has particular utility in repeating dispensers of syringes for chromatographic work, and the like, and is shown and described in such connection, it is to be understood that its utility is not confined thereto.

It is an object of the present invention to provide a repeating dispenser for dispensing minute quantities of fluid.

It is another object of the invention to provide a device of this character which, with one filling, is operational to provide repetitive, accurate discharges of exactly the same amount of fluid.

It is still another object of the invention to provide a device of this character adapted to provide, with one filling, repetitive, accurate fluid dispensing device for making injections into small animals for statistical purposes for example.

It is a further object of the invention to provide a device of this character that is particularly useful in droplet placement for thin layer chromatography, preparation of standard solutions, or for progressive concentrations, and the like.

It is a still further object of the invention to provide a device of this character which includes mechanism which will actuate the plunger of a syringe in exactly equal distances with each actuation of the mechanical device. For example, with the scale of a predetermined length, the plunger is moved fifty times in precise increments with an injection of one-fiftieth (1/50) of the total capacity of the syringe. Other multiples may, of course, be provided such as, for example, 1/100, 1/25 or 1/10 of the total syringe capacity.

It is another object of the invention to provide a mechanism or apparatus of this character wherein standard syringes may be used.

It is still another object of the invention to provide apparatus or a device of this character that is extremely simple in construction and operation.

It is a further object of the invention to provide apparatus of this character that may be easily and quickly assembled or disassembled and re-assembled.

It is a still further object of the invention to provide a device of this character that is relatively inexpensive to manufacture.

It is another object of the invention to provide a device of this character that is extremely accurate in operation.

The characteristics and advantages of the invention are further sufficiently referred to in connection with the following detailed description of the accompanying drawings, which represent one embodiment. After considering this example, skilled persons will understand that variations may be made without departing from the principles disclosed and I contemplate the employment of any structures, arrangements, or modes of operation that are properly within the scope of the appended claims.

Referring to the drawings, which are for illustrative purposes only:

FIG. 1 is a perspective view of a repeating dispenser embodying the present invention;

FIG. 2 is a longitudinal section through the upper portion of the device as viewed in FIG. 1;

FIG. 3 is a sectional view taken on line 3—3 of FIG. 2;

FIG. 4 is an enlarged sectional view taken on line 4—4 of FIG. 2, showing the pawl disengaged from the rack; and FIG. 5 is a similar view showing the pawl in engagement with the rack at the ends of the operative movement thereof.

Referring more particularly to the drawings, there is shown a dispensing mechanism, embodying the present invention, having a body 10 from the top side 12 thereof, an annular flange 14 extends upwardly. There is a cylindrical bore 16 which extends from the upper end of flange 14 into the body 10 and terminates adjacent the bottom side or surface 18, there being a wall 20 closing the bottom or inner end of the bore 16.

There are a pair of longitudinally extending square openings 22 and 24 in the body 10, said openings 24 being in alignment with each other and opening at their inner ends into the bore 16 at one side of the axial center of said bore 16, as best shown in FIG. 2.

Within the openings 22 and 24 is slidably disposed an index rod 26 on a substantial intermediate portion of one side of which are a series of teeth 28. Since index rod 26 is disposed in the openings 22 and 24 with the teeth at the top, the side 30 of said index rod in which the teeth are cut or formed, will be termed the top side. The ends 32 of the teeth 28 are normal to the plane of the top side 30 of said index rod and all of said ends 32 face toward the rear of said index rod. Ends 32 of the teeth are spaced apart and are parallel, it being noted that the outer ends of said sides 32 of teeth 28 terminate at or in substantially the plane of the top side 30. The opposite sides 34 of teeth 28 extend from the outer ends 36 of the sides 32 to the inner ends of the next adjacent sides 32 so that said sides 34 are inclined from the outer ends of the sides 32 forwardly and downwardly in parallel planes which are spaced from each other.

Means for actuating the index rod is provided and comprises a plunger assembly, indicated generally at 40, which includes a body 42 with axially aligned cylindrical end portions 44 and 46 of the same diameter. There is an intermediate portion 48 which connects together the end portions 44 and 46. Exteriorly the intermediate portion 48 is arcuate and has the same radius as the end portions 44 and 46, the radius of said intermediate portion being on the axis of the end portions 44 and 46. At its inner side 50 said intermediate portion is planar or flat and when said plunger assembly is upwardly disposed in the bore 16 said inner side 50 of the intermediate portion is in the same plane as the adjacent vertical sides of the openings 22 and 24. Thus the adjacent or outer side 52 of the index rod 26 will slidably engage said surface or side 50 of the plunger when said index rod is operably disposed in said openings 22 and 24, as best shown in FIGS. 2 and 3.

With this arrangement a recess is provided in the plunger 42 for operable reception of a pawl or dog indicated generally at 56, having an opening 58 adjacent the rear end for pivotal reception of a pivot pin 60 press fitted or otherwise secured in an opening provided therefor in the intermediate portion 48 of the plunger, the pin 60 being normal to the interior face 50 of the intermediate portion of the plunger.

It is to be noted that the pin 60 is adjacent the rear edge of the face or side 50 of the intermediate portion of the plunger but is spaced forwardly of said edge. Opening 58 is adjacent the rear end of a rear portion 60 of the pawl which is comparatively narrow and has generally paralleled top and bottom sides. At its forward end the pawl has a wedge shaped end portion 64. The front end 66 of the wedge portion 64 is substantially normal to the top side of the portion 60 of the pawl while the rear side 68 of said wedge portion 64 is inclined forwardly and toward the front side 66 and meets same in a slightly rounded apex 70.

A retaining pin 72 is pressed fitted or otherwise suitably secured in a bore, not shown, provided therefor in the end portion 44 of the plunger, said pin extending inwardly and overlies at least a portion of the pawl to prevent said pawl from inadvertently sliding off the pivot pin 60. A limit pin or stop 76 is provided and is also suitably secured as by press fit or otherwise, in an opening not shown, provided therefor in the intermediae portion 48 of the plunger. Pin 76 extends from the side or surface 50 of the intermediate portion 48 at an angle normal thereto and is positioned adjacent the inner side of the part 60 of the pawl and limits clockwise movement of the pawl, as shown in the drawings.

Means for yieldingly urging the pawl in such clockwise movement is provided and comprises a spring 80, one end portion of said spring being received in a bore or recess 82 in the inner side of the outer end portion 44 of the plunger. At its opposite end a portion of spring 80 is received in a recess 84 in the outer side of the pawl, said recesses 82 and 84 retaining the spring in operative position, it being noted that when the pawl engages the stop 76 the free or forward end of said pawl is spaced substantially from the inner side of the adjacent portion of the outer end portion 44 of the plunger. Actually the top or outer side of the pawl 56 is spaced from the adjacent inner side of plunger portion 44.

When the above described part of the present mechanism is operably assembled the plunger assembly 40 is slidably disposed in the bore 16 of the body 10. The inner cylindrical end portion 46 of the plunger is disposed inwardly or at the bottom side of the index rod, said plunger being urged outwardly of the bore 16 by yielding means or spring 86 having a substantial end portion operably disposed in a bore or recess 88 extending longitudinally of the plunger from the inner end thereof, said recess 88 being off center and extending into the intermediate portion 48 of said plunger. The opposite end of said spring reacts against the bottom wall 20 of the bore 16.

Under the influence of spring 86 the plunger assembly is urged outwardly to a position whereat the inner or top side or surface 90 of the inner cylindrical end portion 46 of the plunger assembly engages the under side 92 of the index rod so that outward movement of the plunger assembly is thereby limited. When the plunger assembly is in this position the pawl 56 engages the stop pin 76. The apex 70 of the wedge portion 62 of the pawl is then spaced closely adjacent the plane of the top side 30 of the index rod and is positioned just behind an end 32 of one of the teeth 28.

End portion 44 of the plunger extends outwardly of the outer end of the flange 14 and inward pressure on said end portion 44 moves the plunger assembly from the extended position shown in FIG. 4 inwardly, thereby causing the apex 70 of the pawl end 64 to enter the adjacent interdental space and engage the adjacent end wall 32. Upon further inward movement of the plunger assembly the pawl pivots counter-clockwise on the pivot pin 60 causing the apex end to move forwardly in an arc and move the index rod forwardly. Inward movement of the plunger assembly is limited by engagement of the inner cylindrical end portion 46 with the bottom 20 of the bore 16 so that the pawl will move the index rod forwardly a predetermined increment which will be uniformly the same every time the plunger assembly is actuated inwardly to actuate said index rod.

It is to be understood, of course, that the plunger assembly fits loosely enough in the bore 16 so that there will be no trapping of air between the inner end of the plunger and the wall 20, said air escaping about the plunger assembly as it is moved inwardly and returning past the plunger assembly into the space between the inner end of the plunger and said wall 20 when said plunger assembly is moved outwardly by spring 86.

With each actuation of the plunger assembly 40 the index rod is moved forwardly one increment and when said plunger assembly is returned to its outermost position by spring 86 the apex 70 of the pawl will be positioned relevant to the next interdental space of the teeth of the index rod so that upon the next inward actuation of the plunger assembly said apex or point 70 will enter said interdental space, engage the end 32 of the adjacent tooth and effect forward movement of the index rod another increment. Thus the index rod 26 is moved forwardly as many predetermined equal increments as there are teeth.

Body 10 has a laterally extending arm 90 which may be rounded at its free end, said arm having a recess 92 which extends from the rear side of the arm forwardly and terminates in a wall 94 at the forward end of said recess. Wall 90 is provided with an opening 96 therethrough for reception of the barrel 98 of a syringe 100 which may be of conventional character. At its rear end the barrel of the syringe is provided with the usual flange 102 which seats on the inner side of the wall 94. Flange 102 is adapted to fit into the recess 94 and is secured in position by a flat screw 104 which is externally threaded and threadably received in the internally threaded outer end portion 106 of the recess 94. A resilient washer or gasket 108 is disposed between the flange 102 and said screw 104 without exerting direct pressure from the rigid screw, which might break the flange.

Screw 104 has a diametrically extending groove 110 for reception of a suitable tool or implement to tighten same or unscrew same and there is an axial bore 112 through the screw 104 in axial alignment with bore 114 of the barrel 98, said bore 114 extending forwardly from the rear end of said barrel in the usual well known manner.

At the rear end of the index rod there is a laterally extending plunger arm 118 which is secured to said index rod by means of a screw 120 which extends through a bore in plunger arm 118 adjacent one end thereof and is threadably received in a tapped bore in the index rod 26 and which extends forwardly from the rear end of said rod.

Plunger arm 118 extends in the same direction as the arm 90 of the body 10 and said arm 118 has an opening 124 therethrough in alignment with the opening 112 in the screw 104 and the bore 114 of the body 98 of the syringe. From the free end of the plunger arm 118 there extends a tapped bore 126 which extends into the bore 124 and in which is threadably disposed a screw 128.

A syringe plunger 130 is received in the bore 124 in arm 118, bore 112 and screw 104 and bore 114 of the syringe body 98. At its outer end plunger 130 has the usual annular flange or pressure button 132 which is normal to the axis of said plunger and said flange is positioned against the rear side of the plunger arm 118. Screw 126 is screwed inwardly and is of such length that its inner end engages the adjacent portion of the plunger 113 and presses same against the opposite side of the bore 124 to thereby secure the plunger in position and prevent sliding movement of the plunger in said bore 24.

The syringe 100 has the usual needle 136 at its forward end, said needle having a hub 138 whereby said needle is attached to the barrel 98 of the syringe, said barrel having a calibrated scale 140 which extends longitudinally of said barrel. The forward end of the plunger is related to the scale in the usual manner.

When the plunger assembly 40 is in its normal outer release position, as shown in FIG. 4, the index rod may be moved forwardly or rearwardly. Rearward movement of said index rod is limited by a snap ring 144 disposed in a groove provided therefor in the index rod adjacent its forward end. It is to be understood, of course, that the snap ring 144 may be removed from said recess when it is desired to remove the index rod from the body 10. Rod 26 is prevented from unrestrained sliding movement in the body 10 by a nylon friction plug 146 slidable in a bore 147 in the body 10 and which opens into the opening 24. A spring 148 in said bore 147 behind plug 146 urges said plug against the adjacent part of the index rod 26. There is a bore 149 in the body 10 at the opposite side of the opening 24 from bore 147 and bore 149 is closed by a plug 149a. While the plug 146 is of nylon, it is to be understood that any other suitable friction material may be used, the nylon, however, being a resilient material.

*Operation*

By way of example, the syringe scale may be six centimeters precisely in length and divided into fifty precise parts with an injection of one-fiftieth of the total capacity with each actuation of the plunger assembly 40. There will be exactly one-fiftieth of the total capacity of the syringe discharged with each actuation of the plunger assembly 40 and, hence, there is a repetitive accurate discharge with a single filling. One use of the device may be in discharging into a number of reagent flasks for preparation of standard test reagents extremely accurate and exact amounts of fluid from the syringe.

The syringe is filled by conventional pumping to expel air and to fill the bore 114. Since the index rod and plunger 130 move together and since the index rod is readily movable against the friction exerted by the plug 146, such pumping action is readily effected. Thereafter all that is necessary to effect the discharge of precisely measured amounts of fluid is to actuate the plunger assembly 40.

The device is a neat one-handed tool for discharge of liquids and, as above indicated, the syringe can readily be filled in a manner a syringe is normally filled.

The device may be easily and quickly disassembled for cleaning or servicing and as easily and readily re-assembled.

Also, replacement of the syringe 100 may be readily effected and different sizes of syringes may be used.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned except as defined in the accompanying claims, wherein various portions have been separated for clarity of reading and not for emphasis.

I claim:

1. A repeating dispenser, comprising:

(A) a body having an annular flange upstanding from the top side, there being a bore extending from the outer end of said flange into said body, said bore being closed by a wall at the inner end, said body having aligned square openings extending longitudinally therein, the inner ends of said square openings communicating with the bore and to one side of the axis thereof;

(B) an index rod slidably received in said openings, said index rod having a series of teeth over at least a portion of the top side thereof, said teeth each having an end wall facing rearwardly of said index rod and in a plane normal to said rod, the outer ends of said end walls of said teeth being in the plane of the top side of the rod, each of said teeth also having an inclined side extending from the outer end of the rearwardly facing wall forwardly and inwardly to the inner end of the rearwardly facing end wall immediately ahead thereof;

(C) a plunger assembly including a plunger slidably disposed in the bore of said body and having cylindrical end portions connected together by an intermediate semi-cylindrical portion, the inner side of which is flat and when said plunger assembly is in operative position said flat side is in the same plane as the adjacent vertical side of the square openings through the body;

(D) a pivot pin secured to said intermediate portion and extending laterally of the flat side thereof;

(E) a pawl having the rear end pivotally mounted on said pivot pin and movable in a plane parallel to said flat side, the forward end of said pawl having a laterally extending portion terminating in a point normally positioned adjacent the plane of the outer ends of the teeth of said index rod;

(F) means retaining said pawl on said pivot pin;

(G) means limiting pivotal movement of said pawl toward said index rod;

(H) yielding means urging said pawl toward said limiting means;

(I) yielding means urging said plunger outwardly of said bore, the inner cylindrical end portion of the plunger engaging the under side of the index rod and limiting outward movement of said plunger assembly, inward movement of said plunger assembly causing the point of the pawl to enter an interdental space, engage the rearwardly facing wall of a tooth and move the index rod forwardly a predetermined increment, said point of the pawl returning to an operable position relative to the next rearwardly interdental space upon release of said plunger assembly and its movement to its outer limit;

(J) a syringe supporting arm extending laterally of the body and having a recess therein with a forward end wall having an opening therein;

(K) a syringe barrel in said opening and positioned generally parallel to the index rod, said barrel having an outwardly extending flange at the rear end received in the bottom of said recess;

(L) means, including a flat externally threaded screw threadably received in a tapped outer end portion of said recess for securing the syringe flange against the forward end wall of said recess;

(M) said screw having an axial opening therethrough aligned with the axial bore of the syringe;

(N) a plunger arm secured to and extending laterally of the index rod at the rear end thereof, said plunger arm extending in the same direction as the syringe supporting arm and having a bore therein aligned with the bore in the screw;

(O) a syringe plunger disposed in the bore of the plunger arm, bore of the screw and bore of the syringe body;

(P) a scale on said syringe barrel, the forward end of said plunger having cooperative relationship with said scale and movable in predetermined increments of precise and equal lengths upon each actuation of the plunger assembly;

(Q) and friction means for the index rod frictionally inhibiting free movement of the rod in the square openings in the body but permitting operation of said rod.

2. In a repeating dispenser:

(A) a body having a downwardly extending bore therein closed by a wall at the inner end, said body having aligned square openings extending longitudinally therein, the inner ends of said square openings communicating with the bore and to one side of the axis thereof;

(B) an index rod slidably received in said openings, said index rod having a series of teeth uniformly spaced apart longitudinally of said rod and having interdental spaces therebetween;

(C) a plunger assembly including a plunger slidably disposed in the bore of said body and having cylindrical end portions and an intermediate portion, the inner side of which is flat and when said plunger assembly is in operative position said flat side is in the same plane as the adjacent vertical sides of the square openings through the body;
(D) a pawl having its rear end pivotally mounted on the flat side of said intermediate portion in a plane parallel thereto, the forward end of said pawl having a portion terminating in a point normally positioned adjacent the plane of the outer points of the teeth of said index rod;
(E) means limiting pivotal movement of said pawl toward said index rod;
(F) yielding means urging said pawl toward said limiting means;
(G) yielding means urging said plunger outwardly of said bore, the inner side of the inner cylindrical end portion of the plunger engaging the under side of the index rod and limiting outward movement of said plunger assembly, inward movement of said plunger assembly causing the point of the pawl to enter an interdental space, engage a tooth and move the index rod forwardly a predetermined increment at the same time effecting pivotal movement of said dog, said point of the pawl returning to an operable position relative to the next rearwardly interdental space upon release of said plunger assembly and its movement to its outer limit;
(H) a syringe supporting arm extending laterally of the body;
(I) a syringe supported by said arm in generally parallel relation to the index rod, said syringe having a barrel with a longitudinally extending bore therein;
(J) a plunger arm secured to and extending laterally of the index rod at the rear end thereof and secured thereto, said plunger arm extending in the same direction as the syringe supporting arm;
(K) a syringe plunger releasably secured to said plunger arm and operably disposed in the bore of said barrel;
(L) a scale on said syringe barrel, the forward end of said plunger having cooperative relationship with said scale and movable in predetermined increments of precise lengths upon each actuation of the plunger assembly.

3. In a repeating dispenser:
(A) a body having a bore extending inwardly from one side and closed by a wall at the inner end, said body having aligned longitudinally extending openings, the inner ends of which communicate with the bore;
(B) an index rod slidably received in said openings, said index rod having a series of teeth uniformly spaced apart longitudinally of said rod and having interdental spaces therebetween;
(C) a plunger assembly including a plunger slidably disposed in the bore of said body, inward movement of said plunger assembly being limited by engagement of the inner end of said plunger with the wall closing the inner end of said bore;
(D) a dog pivotally carried by said plunger, the free end of said dog having a portion terminating in a point normally positioned adjacent the plane of the outer ends of the teeth of said index rod;
(E) means limiting pivotal movement of said dog toward said index rod with the point of said dog normally being clean of said teeth;
(F) yielding means urging said dog toward said limiting means;
(G) yielding means urging said plunger outwardly of said bore, a portion of the plunger engaging the index rod and limiting outward movement of said plunger assembly, inward movement of said plunger assembly causing the point of the dog to enter an interdental space, engage a tooth and move the index rod forwardly a predetermined increment at the same time effecting pivotal movement of said dog, said point of the dog returning to an operable position relative to the next rearwardly interdental space upon release of said plunger assembly and its movement to its outer limit;
(H) a syringe supporting arm carried by said body;
(I) a syringe having a barrel supported by said arm in generally parallel relation to the index rod, said barrel having a longitudinally extending bore therein;
(J) a plunger arm carried by the index rod adjacent the rear end thereof, said plunger arm extending in the same direction as the syringe supporting arm;
(K) a syringe plunger secured to said plunger arm and operably disposed in the bore of said barrel;
(L) and a scale on said syringe barrel, the forward end of said plunger having cooperative relationship with said scale and movable in predetermined increments of precise lengths upon each actuation of the plunger assembly.

4. In a repeating dispenser:
(A) a body having a bore therein, said body also having aligned longitudinally extending openings therein, the inner ends of said openings communicating with said bore;
(B) an index rod slidably received in said openings, said index rod having a series of teeth uniformly spaced apart longitudinally of said rod and having interdental spaces therebetween;
(C) a plunger assembly including a plunger slidably disposed in the bore of said body;
(D) a dog pivotally carried by said plunger, said dog having a portion terminating in a point normally positioned adjacent the toothed portion of said index rod;
(E) means limiting pivotal movement of said dog toward said index rod with the point of said dog normally cleaning said teeth;
(F) yielding means urging said dog toward said limiting means;
(G) yielding means urging said plunger outwardly of said bore, a portion of the plunger engaging the under side of the index rod and limiting outward movement of said plunger assembly;
(H) means limiting inward movement of said plunger assembly;
(I) means for attaching a syringe barrel to said body, said syringe having a barrel having a longitudinally extending bore therein;
(J) and a syringe plunger connected to said index rod and movable with movements of said rod, said plunger being operably disposed in the bore of said barrel.

5. In a repeating dispenser:
(A) a body having an annular flange upstanding from the top side, there being a bore extending from the outer end of said flange into said body, said bore being closed by a wall at the inner end, said body having aligned square openings extending longitudinally therein, the inner ends of said square openings communicating with the bore and to one side of the axis thereof;
(B) an index rod slidably received in said openings, said index rod having a series of teeth over at least a portion of the top side thereof, said teeth each having an end wall facing rearwardly of said index rod and in a plane normal to said rod, the outer ends of said end walls of said teeth being in the plane of the top side of the rod, each of said teeth also having an inclined side extending from the outer end of the rearwardly facing wall forwardly and inwardly to the inner end of the rearwardly facing end wall immediately ahead thereof.
(C) a plunger assembly including a plunger slidably disposed in the bore of said body and having cylindrical end portions connected together by an intermediate semi-cylindrical portion the inner side of which is flat and when said plunger assembly is in operative position said flat side is in the same plane as the adjacent vertical side of the square openings through the body;

(D) a pivot pin secured to said intermediate portion and extending laterally of the flat side thereof;

(E) a dog having the rear end pivotally mounted on said pivot pin and movable in a plane parallel to said flat side, the forward end of said dog having a laterally extending portion terminating in a point normally positioned adjacent the plane of the outer ends of the teeth of said index rod;

(F) means retaining said dog on said pivot pin;

(G) means limiting pivotal movement of said dog toward said index rod;

(H) yielding means urging said dog toward said limiting means;

(I) yielding means urging said plunger outwardly of said bore, the inner cylindrical end portion of the plunger engaging the under side of the index rod and limiting outward movement of said plunger assembly, inward movement of said plunger assembly causing the point of the dog to enter an interdental space, engage the rearwardly facing wall of a tooth and move the index rod forwardly a predetermined increment, said point of the dog returning to an operable position relative to the next rearwardly interdental space upon release of said plunger assembly and its movement to its outer limit;

(J) means for operably attaching a syringe barrel to said body;

(K) and means for operably securing a syringe plunger to said index rod.

6. In a repeating dispenser:

(A) a body having a bore therein closed by a wall at the inner end, said body having aligned square openings extending longitudinally therein, the inner ends of said square openings communicating with the bore and to one side of the axis thereof;

(B) an index rod slidably received in said openings, said index rod having a series of teeth uniformly spaced apart longitudinally of said rod and having interdental spaces therebetween;

(C) a plunger assembly including a plunger slidably disposed in the bore of said body and having cylindrical end portions and an intermediate portion, the inner side of which is flat and when said plunger assembly is in operative position said flat side is in the same plane as the adjacent vertical sides of the square openings through the body;

(D) a dog having its rear end pivotally mounted on the flat side of said intermediate portion in a plane parallel thereto, the forward end of said dog having a portion terminating in a point normally positioned adjacent the plane of the outer points of the teeth of said index rod;

(E) means limiting pivotal movement of said dog toward said index rod;

(F) yielding means urging said dog toward said limiting means;

(G) and yielding means urging said plunger outwardly of said bore, the inner side of the inner cylindrical end portion of the plunger engaging the under side of the index rod and limiting outward movement of said plunger assembly, inward movement of said plunger assembly causing the point of the dog to enter an interdental space, engage a tooth and move the index rod forwardly a predetermined increment at the same time effecting pivotal movement of said dog, said point of the dog returning to an operable position relative to the next rearwardly interdental space upon release of said plunger assembly and its movement to its outer limit.

7. In a repeating dispenser:

(A) a body having a bore extending inwardly from one side and closed by a wall at the inner end, said body having aligned longitudinally extending openings, the inner ends of which communicate with the bore;

(B) an index rod slidably received in said openings, said index rod having a series of teeth uniformly spaced apart longitudinally of said rod and having interdental spaces therebetween;

(C) a plunger assembly including a plunger slidably disposed in the bore of said body, inward movement of said plunger assembly being limited by engagement of the inner end of said plunger with the wall closing the inner end of said bore;

(D) a dog pivotally carried by said plunger, the free end of said dog having a portion terminating in a point normally positioned adjacent the plane of the outer ends of the teeth of said index rod;

(E) means limiting pivotal movement of said dog toward said index rod with the point of said dog normally being clean of said teeth;

(F) yielding means urging said dog toward said limiting means;

(G) and yielding means urging said plunger outwardly of said bore, a portion of the plunger engaging the index rod and limiting outward movement of said plunger assembly, inward movement of said plunger assembly causing the point of the dog to enter an interdental space, engage a tooth and move the index rod forwardly a predetermined increment at the same time effecting pivotal movement of said dog, said point of the dog returning to an operable position relative to the next rearwardly interdental space upon release of said plunger assembly and its movement to its outer limit.

8. In a repeating dispenser:

(A) a body having a bore therein, said body also having aligned longitudinally extending openings therein, the inner ends of said openings communicating with said bore;

(B) an idex rod slidably received in said openings, said index rod having a series of teeth uniformly spaced apart longitudinally of said rod and having interdental spaces therebetween;

(C) a plunger assembly including a plunger slidably disposed in the bore of said body;

(D) a dog pivotally carried by said plunger, said dog having a portion terminating in a point normally positioned adjacent the toothed portion of said index rod;

(E) means limiting pivotal movement of said dog toward said index rod with the point of said dog normally clearing said teeth;

(F) yielding means urging said dog toward said limiting means;

(G) yielding means urging said plunger outwardly of said bore, a portion of the plunger engaging the under side of the index rod and limiting outward movement of said plunger assembly;

(H) and means limiting inward movement of said plunger assembly.

9. A plunger assembly for a repeating dispenser, comprising:

(A) a plunger having cylindrical end portions and an intermediate outer arcuate portion, the inner side of which is flat, said plunger assembly being adapted to be slidably disposed in the cylindrical bore of a body member;

(B) a pivot pin secured to said intermediate portion and extending laterally of the flat side thereof;

(C) a dog having the rear end pivotally mounted on said pivot pin and movable in a plane parallel to said flat side, the forward end of said dog having a laterally extending portion terminating in a point for successive engagement with teeth of an index rod;
(D) means retaining said dog on said pivot pin;
(E) yielding means reacting against one of the plunger end portions urging said dog toward the other end of said plunger;
(F) and means limiting spring urged pivotal movement of said dog.

10. In a repeating dispenser:
(A) a body;
(B) a syringe supporting arm extending laterally of the body and having a recess therein with an end wall having an opening of smaller diameter than said recess for reception of the barrel of a syringe;
(C) and a flat externally threaded screw threadably received in a tapped outer end portion of said recess for securing a syringe flange against the forward end wall of said recess, said screw having an axial opening therethrough aligned with the opening in the end wall of said recess in which the plunger of a syringe is adapted to operably slide.

11. A plunger assembly for a repeating dispenser, comprising:
(A) a plunger having cylindrical end portions and an intermediate recess closed at one side by a wall flat at its inner side, said plunger assembly being adapted to be slidably disposed in a cylindrical bore of a body member;
(B) a pivot pin secured to the recess wall and projecting into said recess normal to the flat side of said wall;
(C) a dog having the rear end pivotally mounted on said pivot pin and movable in a plane parallel to said flat side, said dog being within a cylindrical plane common to said cylindrical end portions, the forward end of said dog having a laterally extending portion terminating in a point for successive engagement with the teeth of an index rod;
(D) means retaining said dog on said pivot pin;
(E) yielding means urging said dog toward the inner end of said plunger;
(F) and means limiting spring urged pivotal movement of said dog.

12. A plunger assembly for a repeating dispenser, comprising:
(A) a plunger having cylindrical end portions and an intermediate recess, said plunger assembly being adapted to be slidably disposed in a cylindrical bore of a body member;
(B) a dog operably mounted in said recess, said dog being within a cylindrical plane common to said cylindrical end portions, said dog having a portion terminating in a point for successive engagement with the teeth of an index rod;
(C) yielding means urging said dog toward the inner end of said plunger;
(D) and means limiting spring urged pivotal movement of said dog.

13. In a repeating dispenser:
(A) a body having a recess therein, said body also having aligned longitudinally extending openings therein, the inner ends of said openings communicating with said recess;
(B) an index rod slidably received in said openings, said index rod having a series of teeth uniformly spaced apart longitudinally of said rod and having interdental spaces therebetween;
(C) a plunger assembly including a plunger slidably disposed in the recess of said body;
(D) a dog operably carried by said plunger, said dog having a portion terminating in a point normally positioned adjacent the toothed portion of said index rod;
(E) means limiting movement of said dog toward said index rod with the point of said dog normally clearing said teeth;
(F) yielding means urging said dog toward said limiting means;
(G) yielding means urging said plunger outwardly of said recess, a portion of the plunger engaging the under side of the index rod and limiting outward movement of said plunger assembly;
(H) and means limiting inward movement of said plunger assembly.

14. In a repeating dispenser:
(A) a body having a bore therein, said body also having aligned longitudinally extending openings therein, the inner ends of said openings communicating with said bore;
(B) an index rod slidably received in said openings, said index rod having a series of teeth uniformly spaced apart longitudinally of said rod and having interdental spaces therebetween;
(C) a plunger assembly including a plunger slidably disposed in the bore of said body and biased outwardly in said bore, said plunger assembly being limited in both inward and outward movements;
(D) a dog pivotally carried by said plunger and biased toward said index rod, said dog having a portion terminating in a point normally positioned adjacent the toothed portion of said index rod;
(E) and means limiting pivotal movement of said dog toward said index rod with the point of said dog normally clearing said teeth.

15. In a repeating dispenser:
(A) a body having a recess therein, said body also having aligned longitudinally extending openings therein, the inner ends of said openings communicating with said recess;
(B) an index rod slidably received in said openings, said index rod having a series of teeth uniformly spaced apart longitudinally of said rod and having interdental spaces therebetween;
(C) a plunger assembly including a plunger slidably disposed in the recess of said body;
(D) a dog pivotally carried by said plunger, said dog having a portion terminating in a point normally positioned adjacent the toothed portion of said index rod;
(E) means limiting pivotal movement of said dog toward said index rod;
(F) yielding means urging said dog toward said limiting means;
(G) yielding means urging said plunger outwardly of said recess;
(H) means limiting outward movement of said plunger assembly;
(I) and means limiting inward movement of said plunger assembly.

16. In a repeating dispenser:
(A) a body having a recess therein, said body also having aligned longitudinally extending openings therein, the inner ends of said openings communicating with said recess;
(B) an index rod slidably received in said openings, said index rod having a series of teeth uniformly spaced apart longitudinally of said rod and having interdental spaces therebetween;
(C) a plunger assembly including a plunger slidably disposed in the recess of said body;
(D) a dog pivotally carried by said plunger, said dog having a portion terminating in a point normally positioned adjacent the toothed portion of said index rod;
(E) means limiting pivotal movement of said dog toward said index rod;
(F) yielding means urging said dog toward said limiting means;

(G) yielding means urging said plunger outwardly of said recess;
(H) means limiting outward movement of said plunger assembly;
(I) means limiting inward movement of said plunger assembly;
(J) a syringe having a barrel and a plunger;
(K) means for securing said syringe barrel to said body;
(L) means operably connecting together said index rod and plunger;
(M) and a scale on said barrel, the forward end of said plunger having cooperative relationship with said scale and movable in predetermined increments of precise lengths upon each actuation of the plunger assembly.

17. In a repeating dispenser:
(A) a body having a recess therein, said body also having aligned longitudinally extending openings therein, the inner ends of said openings communicating with said recess;
(B) an index rod slidably received in said openings, said index rod having a series of teeth uniformly spaced apart longitudinally of said rod and having interdental spaces therebetween;
(C) a plunger assembly including a plunger slidably disposed in the recess of said body;
(D) a dog pivotally carried by said plunger, said dog having a portion terminating in a point normally positioned adjacent the toothed portion of said index rod;
(E) means limiting pivotal movement of said dog toward said index rod;
(F) yielding means urging said dog toward said limiting means;
(G) yielding means urging said plunger outwardly of said recess;
(H) means limiting outward movement of said plunger assembly;
(I) means limiting inward movement of said plunger assembly;
(J) a syringe having a barrel and a plunger;
(K) means for securing said syringe barrel to said body;
(L) means operably connecting together said index rod and plunger;
(M) and a scale on said barrel, operably related to said plunger.

References Cited by the Examiner
UNITED STATES PATENTS

| | | | |
|---|---|---|---|
| 1,908,626 | 5/33 | Ford | 74—128 X |
| 2,180,042 | 11/39 | Ettinger | 211—74 |
| 2,180,978 | 11/39 | Crewe | 222—391 X |
| 2,576,131 | 11/51 | Lyon | 74—128 X |
| 2,732,101 | 1/56 | Sohn | 222—391 X |

FOREIGN PATENTS 728,816   4/55   Great Britain.

LOUIS J. DEMBO, *Primary Examiner.*